United States Patent
Feder et al.

(10) Patent No.: US 10,333,645 B2
(45) Date of Patent: Jun. 25, 2019

(54) NONLINEAR NOISE CANCELLATION IN WAVELENGTH DIVISION MULTIPLEXING (WDM) SYSTEMS

(71) Applicant: Ramot at Tel-Aviv University Ltd., Tel Aviv (IL)

(72) Inventors: Meir Feder, Herzelia (IL); Ronen Dar, Tel Aviv (IL); Mark Shtaif, Even Yehuda (IL); Antonio Mecozzi, L'Aquila (IT)

(73) Assignee: RAMOT at Tel Aviv University Ltd, Tel Aviv (IL)

(*) Notice: Subject to any disclaimer, the term of this patent is extended or adjusted under 35 U.S.C. 154(b) by 553 days.

(21) Appl. No.: 14/540,064

(22) Filed: Nov. 13, 2014

(65) Prior Publication Data
US 2015/0139641 A1   May 21, 2015

Related U.S. Application Data

(60) Provisional application No. 61/903,412, filed on Nov. 13, 2013, provisional application No. 62/050,804, filed on Sep. 16, 2014.

(51) Int. Cl.
| H04B 10/00 | (2013.01) |
| H04J 14/02 | (2006.01) |
| H04B 10/079 | (2013.01) |
| H04B 10/2557 | (2013.01) |

(52) U.S. Cl.
CPC ...... *H04J 14/0227* (2013.01); *H04B 10/0795* (2013.01); *H04B 10/2557* (2013.01)

(58) Field of Classification Search
USPC .................................................. 398/202–214
See application file for complete search history.

(56) References Cited

U.S. PATENT DOCUMENTS

| 7,076,168 | B1 * | 7/2006 | Shattil | H04B 10/25752 |
| | | | | 398/202 |
| 7,194,025 | B2 * | 3/2007 | Wood | H04L 25/03133 |
| | | | | 375/231 |
| 7,266,310 | B1 * | 9/2007 | Savory | H04B 10/61 |
| | | | | 398/205 |
| 7,418,212 | B1 * | 8/2008 | Bontu | H04L 25/061 |
| | | | | 375/232 |
| 7,596,323 | B1 * | 9/2009 | Price | H04B 10/0775 |
| | | | | 398/140 |

(Continued)

OTHER PUBLICATIONS

P. P. Mitra and J. B. Stark, "Nonlinear limits to the information capacity of optical fibre communications," Nature, vol. 411, No. 6841, pp. 1027-1030, 2001.

(Continued)

*Primary Examiner* — Agustin Bello
(74) *Attorney, Agent, or Firm* — Reches Patents

(57) ABSTRACT

A method that may include receiving a block of signals from a certain wavelength division multiplex (WDM) channel out of a set of WDM channels; analyzing at least a first sub-block of signals of the block of signals to provide analysis results indicative of interferences that affect the first sub-block of signals and result from transmissions over other WDM channels of the set of WDM channels; and mitigating interferences that affect the block of signals in response to the analysis results.

3 Claims, 18 Drawing Sheets

(56) References Cited

U.S. PATENT DOCUMENTS

| | | | | |
|---|---|---|---|---|
| 7,684,712 | B1* | 3/2010 | Roberts | H04B 10/60 375/341 |
| 7,747,169 | B2* | 6/2010 | Koc | H04B 10/61 398/152 |
| 8,023,834 | B2* | 9/2011 | Koc | H04B 10/61 398/202 |
| 8,401,402 | B2* | 3/2013 | Cai | H04J 14/02 398/159 |
| 8,855,504 | B2* | 10/2014 | Bulow | H04B 10/2507 398/158 |
| 8,953,950 | B2* | 2/2015 | Nazarathy | H03M 1/145 398/188 |
| 8,977,136 | B2* | 3/2015 | Sigron | H04B 10/6165 398/203 |
| 8,977,138 | B2* | 3/2015 | Proesel | G01J 1/46 398/208 |
| 9,020,364 | B2* | 4/2015 | Xie | H04B 10/6161 398/202 |
| 9,025,651 | B1* | 5/2015 | Dave | H04B 10/2569 375/229 |
| 9,036,999 | B2* | 5/2015 | Kaneda | H04B 10/516 370/203 |
| 2004/0252754 | A1* | 12/2004 | Wood | H04L 25/03133 375/232 |
| 2005/0047802 | A1* | 3/2005 | Jaynes | H04B 10/2513 398/208 |
| 2008/0253777 | A1* | 10/2008 | Delve | H04L 25/03019 398/208 |
| 2010/0232796 | A1* | 9/2010 | Cai | H04B 10/677 398/79 |
| 2010/0232797 | A1* | 9/2010 | Cai | H04J 14/02 398/79 |
| 2010/0329670 | A1* | 12/2010 | Essiambre | H04B 10/2581 398/43 |
| 2015/0139641 | A1* | 5/2015 | Feder | H04J 14/0227 398/34 |
| 2016/0099818 | A1* | 4/2016 | Eliaz | H04L 25/03006 375/343 |

OTHER PUBLICATIONS

K. S. Turitsyn, S. A. Derevyanko, I. V. Yurkevich, and S. K. Turitsyn, "Information capacity of optical fiber channels with zero average dispersion," Physical review letters, vol. 91, No. 20, p. 203901, 2003.

R.-J. Essiambre, G. Kramer, P. J. Winter, G. J. Fos-chini, and B. Goebel, "Capacity limits of optical fiber net-works," Journal of Lightwave Technology, vol. 28, No. 4, pp. 662-701, 2010.

A D. Ellis, J. Zhao, and D. Cotter, "Approaching the non-linear Shannon limit," Journal of Lightwave Technology, vol. 28, No. 4, pp. 423-433, 2010.

G. Bosco, P. Poggiolini, A. Carena, V. Curri, and F. Forghieri, "Analytical results on channel capacity in uncompensated optical links with coherent detection," Optics Express, vol. 19, No. 26, pp. B440-B451, Dec. 2011.

A. Mecozzi and R. J. Essiambre, "Nonlinear shannon limit in pseudolinear coherent systems," Journal of Light-wave Technology, vol. 30, No. 12, pp. 2011-2024, 2012.

E. Agrell and M. Karlsson, "WDM channel capacity and its dependence on multichannel adaptation models," in Optical Fiber Communication Conference. Optical Society of America, 2013.

P. J. Winter and G. J. Foschini, "MIMO capacities and outage probabilities in spatially multiplexed optical transport systems," Optics Express, vol. 19, No. 17, pp. 16680-16696, 2011.

T. M. Cover and J. A. Thomas, Elements of Information Theory, 2nd ed. Wiley, 1991.

A. Lapidoth and S. Moser, "Capacity bounds via dual-ity with applications to multiple-antenna systems on flat-fading channels," IEEE Transactions on Information The-ory, vol. 49, No. 10, pp. 2426-2467, 2003.

P. Poggiolini et al., PTL 23, 742, (2011).

P. Johannisson et al., JLT 31, 1273, (2013).

A. Bononi et al., arXiv:1207.4729 (2012).

C. Xie et al., "Transmission of Mixed 224-Gb/s and 112-Gb/s PDM-QPSK at 50-GHz Channel Spacing Over 1200-km Dispersion-Managed LEAF Spans and Three ROADMs," J. Lightwave Technol., vol. 30, p. 547 (2012).

S. Haykin, Adaptive filter theory, Pearson Education (2005).

* cited by examiner

NONLINEAR NOISE CANCELLATION IN WAVELENGTH DIVISION MULTIPLEXING (WDM) SYSTEMS

RELATED APPLICATIONS

This patent application claims priority from U.S. provisional patent Ser. No. 61/903,412 filing date Nov. 13, 2013 and from U.S. provisional patent Ser. No. 62/050,804 filing date Sep. 16, 2014, both being incorporated herein by reference.

BACKGROUND

WDM communication schemes treat various noises (phase noises, ISI) as being non-predictable and thus reduce the expected performance of WDM systems.

The following articles provide some illustration of the prior art in relation to one or both of the provisional patents cited above, depending upon their date:

[1] P. P. Mitra and J. B. Stark, "Nonlinear limits to the information capacity of optical fibre communications," *Nature*, vol. 411, no. 6841, pp. 1027-1030, 2001.
[2] K. S. Turitsyn, S. A. Derevyanko, I. V. Yurkevich, and S. K. Turitsyn, "Information capacity of optical fiber channels with zero average dispersion," *Physical review letters*, vol. 91, no. 20, p. 203901, 2003.
[3] R.-J. Essiambre, G. Kramer, P. J. Winzer, G. J. Fos-chini, and B. Goebel, "Capacity limits of optical fiber networks," *Journal of Lightwave Technology*, vol. 28, no. 4, pp. 662-701, 2010.
[4] A. D. Ellis, J. Zhao, and D. Cotter, "Approaching the non-linear Shannon limit," *Journal of Lightwave Technology*, vol. 28, no. 4, pp. 423-433, 2010.
[5] G. Bosco, P. Poggiolini, A. Carena, V. Curri, and F. Forghieri, "Analytical results on channel capacity in uncompensated optical links with coherent detection," *Optics Express*, vol. 19, no. 26, pp. B440-B451, December 2011.
[6] A. Mecozzi and R. J. Essiambre, "Nonlinear shannon limit in pseudolinear coherent systems," *Journal of Lightwave Technology*, vol. 30, no. 12, pp. 2011-2024, 2012.
[7] E. Agrell and M. Karlsson, "WDM channel capacity and its dependence on multichannel adaptation models," in *Optical Fiber Communication Conference*. Optical Society of America, 2013.
[8] P. J. Winzer and G. J. Foschini, "MIMO capacities and outage probabilities in spatially multiplexed optical transport systems," *Optics Express*, vol. 19, no. 17, pp. 16 680-96, 2011.
[9] T. M. Cover and J. A. Thomas, *Elements of Information Theory*, 2nd ed. Wiley, 1991.
[10] A. Lapidoth and S. Moser, "Capacity bounds via duality with applications to multiple-antenna systems on flat-fading channels," *IEEE Transactions on Information Theory*, vol. 49, no. 10, pp. 2426-2467, 2003.
[11] P. Poggiolini et al., PTL 23, 742, (2011).
[12] P. Johannisson et al., JLT 31, 1273, (2013).
[13] A. Bononi et al., arXiv:1207.4729 (2012).
[14] C. Xie et al., "Transmission of Mixed 224-Gb/s and 112-Gb/s PDM-QPSK at 50-GHz Channel Spacing Over 1200-km Dispersion-Managed LEAF Spans and Three ROADMs," J. Lightwave Technol., Vol. 30, p. 547 (2012).
[15] S. Haykin, Adaptive filter theory, Pearson Education (2005).

SUMMARY

According to an embodiment of the invention there may be provided a method that may include receiving or determining a bound of a wavelength division multiplex (WDM) communication taking into account that a phase noise changes at a rate that facilitates an appliance of phase noise cancellation for at least some symbols of a block of symbols; and determining a WDM communication scheme based upon the bound.

The method may include exchanging information according to the WDM communication scheme.

The exchanging may include utilizing Raman amplifiers at receivers that receive the symbols.

According to an embodiment of the invention there may be provided a method that may include receiving or determining a bound of a wavelength division multiplex (WDM) communication taking into account that inter-symbol interference (ISI) changes at a rate that facilitates an appliance of ISI cancellation for at least some symbols of a block of symbols; and determining a WDM communication scheme based upon the bound.

The method may include exchanging information according to the WDM communication scheme.

The exchanging may include utilizing Raman amplifiers at receivers that receive the symbols.

According to an embodiment of the invention there may be provided a system that may include a computer that is arranged to receive or determine a bound of a wavelength division multiplex (WDM) communication taking into account that the phase noise changes at a rate that facilitates an appliance of phase noise cancellation for at least some symbols of a block of symbols; and determine a WDM communication scheme based upon the bound.

According to an embodiment of the invention there may be provided a method that may include determining a WDM communication scheme based upon the capability to measure and cancel phase noise per block of symbols; and exchanging information according to the WDM communication scheme.

According to an embodiment of the invention there may be provided a method that may include exchanging information that is conveyed in multiple blocks of symbols, wherein the exchanging of information comprises learning and cancelling phase noise per block of symbols.

According to an embodiment of the invention there may be provided non-transitory computer readable medium that may store instructions that once executed by a computer will cause the computer to execute the stages of: determining a WDM communication scheme based upon the capability to measure and cancel phase noise per block of symbols; and (b) exchanging information according to the WDM communication scheme.

According to an embodiment of the invention there may be provided non-transitory computer readable medium that may store instructions that once executed by a computer will cause the computer to execute the stages of: exchanging information that is conveyed in multiple blocks of symbols, wherein the exchanging of information comprises learning and cancelling phase noise per block of symbols.

According to an embodiment of the invention there may be provided a system that may include a computer for determining a WDM communication scheme based upon the capability to measure and cancel phase noise per block of symbols.

The system may include a transceiver for exchanging information according to the WDM communication scheme.

According to an embodiment of the invention there may be provided a system that may include a WDM transceiver that is arranged to exchange information that is conveyed in multiple blocks of symbols and a noise cancellation module that is arranged to learn the phase noise and cancel the phase noise per block of symbols.

According to an embodiment of the invention there may be provided a method that may include determining a WDM communication scheme based upon the capability to measure and cancel ISI per block of symbols; and exchanging information according to the WDM communication scheme.

According to an embodiment of the invention there may be provided a method that may include exchanging information that is conveyed in multiple blocks of symbols, wherein the exchanging of information comprises learning and cancelling ISI per block of symbols.

According to an embodiment of the invention there may be provided non-transitory computer readable medium that may store instructions that once executed by a computer will cause the computer to execute the stages of: determining a WDM communication scheme based upon the capability to measure and cancel ISI per block of symbols; and (b) exchanging information according to the WDM communication scheme.

According to an embodiment of the invention there may be provided non-transitory computer readable medium that may store instructions that once executed by a computer will cause the computer to execute the stages of: exchanging information that is conveyed in multiple blocks of symbols, wherein the exchanging of information comprises learning and cancelling ISI per block of symbols.

According to an embodiment of the invention there may be provided a system that may include a computer for determining a WDM communication scheme based upon the capability to measure and cancel ISI per block of symbols.

The system may include a transceiver for exchanging information according to the WDM communication scheme.

According to an embodiment of the invention there may be provided a system that may include a WDM transceiver that is arranged to exchange information that is conveyed in multiple blocks of symbols and a noise cancellation module that is arranged to learn the ISI and cancel the ISI per block of symbols.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
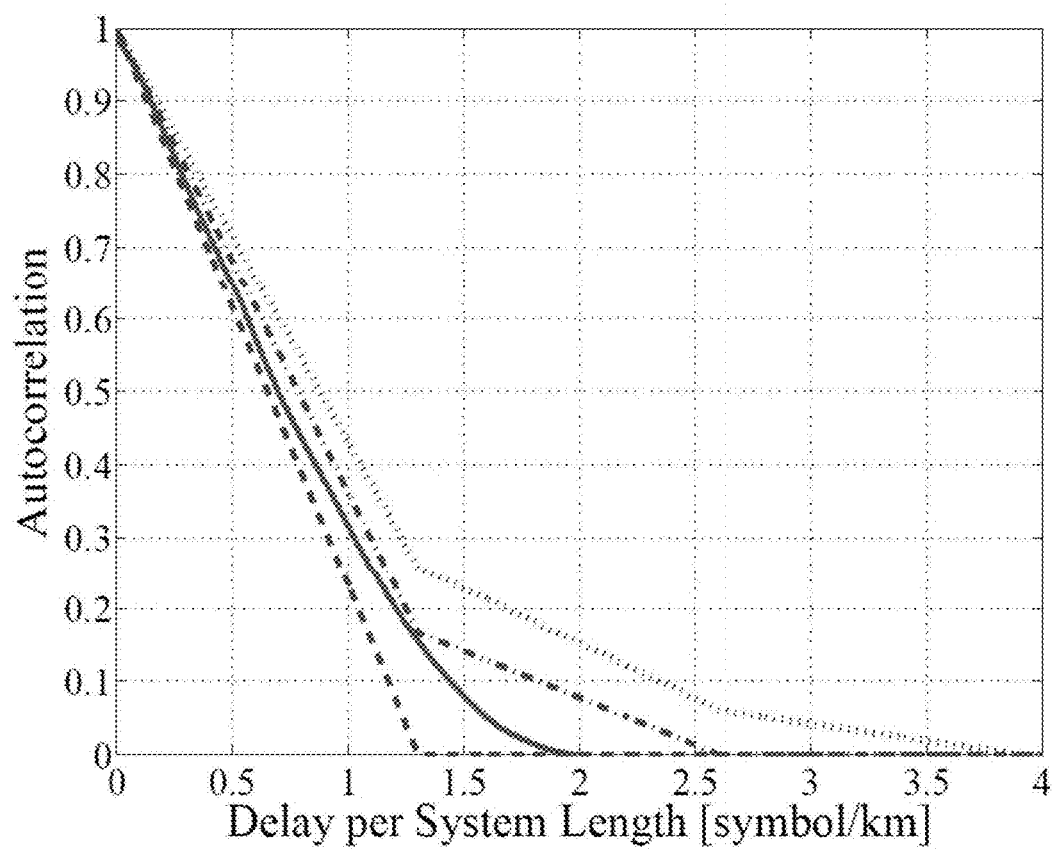
FIGS. 1, 2, 3A-3C illustrate an autocorrelation function, a numerically estimated sigma-effective, a capacity lower bound versus linear SNR for links of various lengths, maximum achievable transmission distances and SNR versus average power according to various embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Various embodiments of the inventions are illustrated in "New Bounds on the Capacity of Fiber-Optics Communications" and "Time varying ISI model for nonlinear interference noise" both articles are attached to this specification as Appendixes A and B respectively and form an integral part of the patent application. Additional embodiments are illustrated in U.S. provisional patent 62/050,804 filing date Sep. 16, 2014, which is incorporated by reference.

It has been found that the effect of nonlinear interference noise (NUN) in Wavelength Division Multiplex (WDM) systems can be described as intersymbol interference (ISI) with slowly changing coefficients, as specified in Eq. 1 of Appendix A of U.S. provisional patent Ser. No. 61/903,412 filing date Nov. 13, 2013 which is incorporated by reference.

Appendix A of U.S. provisional patent Ser. No. 61/903,412 filing date Nov. 13, 2013 which is incorporated by reference, illustrated a new lower bound for the capacity of the nonlinear fiber channel By taking into account the fact that phase-noise is one of the most significant consequences of nonlinear interference, and by taking advantage of the fact that this noise is characterized by strong temporal correlations the inventors have showed that one can increase the peak capacity per polarization by roughly 1 bits/Hz, equivalent to doubling the SNR in a linear system. Equivalently, the inventors showed that the length of a system can be doubled for a given transmission rate.

Equation 0 provides a new lower bound for a capacity of the system and equals:

$$\text{Log}_2\left(1 + \frac{P}{\sigma_{\mathit{eff}}^2}\right) - \frac{1}{2N} E_v\left\{\text{Log}_2\left(1 + v\sigma_c^2 \frac{P}{\sigma_{\mathit{eff}}^2}\right)\right\} - \frac{1}{2N} E_v\left\{\text{Log}_2\left(1 + v\sigma_v^2 \frac{P}{\sigma_{\mathit{eff}}^2}\right)\right\}$$

Wherein:

$\sigma_{\mathit{eff}}^2 = \sigma_{ASE}^2 + \sigma_{NL}^2$

P is the power of the symbols;

$\sigma_{ASE}$ is the variance of the amplified spontaneous emission;

$\sigma_{NL}$ is the variance of all of the nonlinear noise contributions that do not manifest themselves as a phase noise;

$\sigma_S$ is the variance of the sinus of the phase noise;

$\sigma_C$ is the variance of the cosine of the phase noise;

Ev stands for ensemble averaging with respect to a standard Chi-square distribution variable v with 2N degrees of freedom.

Phase Noise Cancellation

FIG. 1 illustrates that the phase noise changes slowly—and that in multiple kilometer WDM fibers the phase noise is maintained substantially the same through blocks of multiple symbols—thus phase noise measured over some symbols of the block can be used for cancelling phase noise in the other symbols (or all symbols of the block) of the block. For example, in 100 km link, the block of symbols (in which phase noise measurement is relevant for phase noise cancellation) is about 60 symbols long.

The learning of the phase noise can occur over one or more symbols of the blocks and even over the entire symbols of the blocks. The learning and cancelling process can be executed in an iterative manner—learning phase noise, cancelling phase noise, evaluating the outcome of the cancelling process and adjusting the cancellation process. The symbols (some or all) of a block can be buffered in order to learn the phase noise and to determine how to cancel it and then the cancellation can be applied on symbols of the block—including those that were processed during the learning phase.

According to an embodiment of the invention a WDM transmission method can be provided and may include: (a) determining a WDM communication scheme based upon the capability to measure and cancel phase noise per block of symbols; and (b) exchanging information according to the WDM communication scheme.

According to an embodiment of the invention a WDM transmission method can be provided and may include exchanging information that is conveyed in multiple blocks of symbols, wherein the exchanging of information comprises learning and cancelling phase noise per block of symbols.

According to an embodiment of the invention a non-transitory computer readable medium can be provided that stores instructions that once executed by a computer will cause the computer to execute the stages of: determining a WDM communication scheme based upon the capability to measure and cancel phase noise per block of symbols; and (b) exchanging information according to the WDM communication scheme.

According to an embodiment of the invention a non-transitory computer readable medium can be provided that stores instructions that once executed by a computer will cause the computer to execute the stages of: exchanging information that is conveyed in multiple blocks of symbols, wherein the exchanging of information comprises learning and cancelling phase noise per block of symbols.

According to an embodiment of the invention a system for WDM transmission can be provided and may include: a computer for determining a WDM communication scheme based upon the capability to measure and cancel phase noise per block of symbols. The system may also include a transceiver for exchanging information according to the WDM communication scheme.

According to an embodiment of the invention a WDM transceiver can be provided and can be arranged to exchange information that is conveyed in multiple blocks of symbols. The WDM transceiver includes or is coupled to a noise cancellation module (a processor) that is arranged to learn the phase noise and cancel the phase noise per block of symbols.

WDM Method for Phase Noise Cancellation

According to an embodiment of the invention a WDM transmission method can be provided and may include: (a) receiving and/or determining a bound of fiber-optics communication taking into account that the phase noise changes relatively slowly and thus noise cancellation can be applied for at least some symbols of the block; (b) determining a WDM communication scheme based upon the bound (so that the communication throughput reaches the bound or is slightly below the bound); and (c) exchanging information according to the WDM communication scheme. The scheme can be determined based upon equation 0.

According to an embodiment of the invention a WDM transmission method can be provided and may include exchanging information according to a communication scheme that is responsive to a WDM fiber optics bound that is determined taking into account that the phase noise changes relatively slowly and thus noise cancellation can be applied for at least some symbols of the block (the communication scheme can be set so that the communication throughput reaches the bound or is slightly below the bound). The scheme can be determined based upon equation 0.

According to an embodiment of the invention a non-transitory computer readable medium can be provided that stores instructions that once executed by a computer will cause the computer to execute the stages of: (a) receiving and/or determining a bound of fiber-optics WDM communication taking into account that the phase noise changes relatively slowly and thus noise cancellation can be applied for at least some symbols of the block; (b) determining a WDM communication scheme based upon the bound (so that the communication throughput reaches the bound or is slightly below the bound); and (c) exchanging information according to the WDM communication scheme. The scheme can be determined based upon equation 0.

According to an embodiment of the invention a non-transitory computer readable medium can be provided that stores instructions that once executed by a computer will cause the computer to execute the stages of exchanging information according to a WDM communication scheme that is responsive to a bound that is determined taking into account that the phase noise changes relatively slowly and thus noise cancellation can be applied for at least some symbols of the block (the communication scheme can be set so that the communication throughput reaches the bound or is slightly below the bound). The scheme can be determined based upon equation 0.

According to an embodiment of the invention a system for WDM transmission can be provided and may include: a computer for receiving and/or determining a bound of WDM fiber-optics communication taking into account that the phase noise changes relatively slowly and thus noise cancellation can be applied for at least some symbols of the block and for determining a WDM communication scheme based upon the bound (so that the communication throughput reaches the bound or is slightly below the bound). The system may also include a transceiver for exchanging information according to the WDM communication scheme. The scheme can be determined based upon equation 0.

According to an embodiment of the invention a WDM transceiver can be provided and can be arranged to exchange information according to a WDM communication scheme that is responsive to a bound that is determined taking into account that the phase noise changes relatively slowly and thus noise cancellation can be applied for at least some symbols of the block (the communication scheme can be set so that the WDM communication throughput reaches the bound or is slightly below the bound). The scheme can be determined based upon equation 0.

ISI Cancellation

The inventors further suggest to generalize the concept of Appendix A of US provisional patent serial number 61903412 filing date Nov. 13, 2013 which is incorporated by reference and show that a channel with NLIN is rigorously equivalent to a linear channel with time-varying inter-symbol interference (ISI). In other words, the n-th received sample in the channel of interest can be written as $r_n = a_n + \Delta a_n$, where $a_n$ is the data symbol transmitted over the channel of interest, and where the following equation illustrates the NLIN:

$$\Delta a_n = \Sigma_k h_k^{(n)} a_{n-k} \qquad (1)$$

The ISI coefficients $h_k^{(n)}$ depend on the data transmitted in the neighboring (interfering) WDM channels in a way that will be specified in what follows. Their dependence on time (which is reflected by the presence of the superscript n in $h_k^{(n)}$) will be shown to be very slow on the scale of a symbol duration and hence they can be estimated and tracked based on real-time measurements of the channel of interest.

Knowledge of the coefficients $h_k^{(n)}$ implies that rather than treating the error signal $\Delta a_n$ as noise, one can extract the information on the data symbols from $\Delta a_n$ by applying standard signal processing methods (such as sequential decoding, or adaptive decision feedback equalization), and significantly reduce the detection error. We note that the zero-th coefficient, $h_0^{(n)}$, has the form $h_0^{(n)} = i\theta_n$, where $\theta_n$ is the phase-noise coefficient which was presented in [6] and whose cancellation was the subject of the provisional patents incorporated by reference.

The inventors provide simple closed form expressions for the mean-square values of the coefficients $h_k^{(n)}$, which allows us to evaluate the overall NLIN power:

$$\langle |\Delta a_n|^2 \rangle = \langle |a_n|^2 \langle \Sigma_k |h_k^{(n)}|^2 \rangle \rangle \qquad (2)$$

This also allows an evaluation of the NLIN power that remains after some of the ISI contributions are eliminated by means of adaptive equalization. For example, upon cancellation of phase-noise, which is represented by the zeroth coefficient $h_0^{(n)}$, the remaining NLIN power is obtained by summing the last equation over all indices $|k| \geq 1$. This result completes the analyses of the provisional patents incorporated by reference by providing explicit analytical expressions not only for the phase-noise itself, but also for the noise that remains after its cancellation. We show in what follows that the contributions of the various terms in the last equation to the NUN reduce as $k^{-2}$ and that compensation for only three coefficients ($k = -1, 0, 1$), leads to the reduction of the nonlinear noise variance by more than an order of magnitude, whereas cancellation of only the zeroth term (phase-noise) reduces the NLIN power by a factor of 3.5 [6].

The analytical part included above focuses on NLIN due to cross-phase modulation (XPM), which is known to be the dominant inter-channel nonlinearity in many systems of practical interest.

The excellent agreement between our theory and simulations (which include all nonlinear effects) supports this assumption. Additionally, since in this work we are concerned with introducing the principle of nonlinearity cancellation, the analytical and numerical results that we report correspond to a system with perfectly distributed gain. This is the same scenario as the one in which the capacity limits of the nonlinear fiber-optic channel have been assessed [3], and in this case the performance depends only on the overall length of the system independently of the number of spans that it is divided into. However, we stress that the principle reflected by Eq. (1) holds in general, regardless of the assumed amplification profile.

Theory and Results

The detection error due to XPM effects was analyzed in [6] where (for the case of a single interfering channel) it was shown to have the form $$\Delta a_n = 2i\gamma \Sigma_{k,l,m} a_{n-k} b^*_{n-l} b_{n-m} X_{k,l,m}, \qquad (3)$$

Where $\gamma$ is the nonlinearity coefficient, $\{b_j\}$ are the data symbols in the interfering channel and $X_{k,l,m}$ is a coefficient [6] whose value is defined by the waveforms of the individual pulses, the channel separation, the dispersion coefficient, and the length of the optical link. In the case of multiple interfering channels, $\Delta a_n$ is equal to the sum of the individual contributions. Equation (1) follows immediately by rearranging the coefficients and identifying $h_k^{(n)} = 2i\gamma \Sigma_{l,m} b^*_{n-l} b_{n-m} X_{k,l,m}$. We note that (as can be seen from [6]) the zeroth-order coefficient $h_0^{(n)} = i\theta_n$ with $\theta_n$ being phase-noise. Our goal is to characterize the statistics of the ISI coefficients $h_k^{(n)}$ (mean, variance and autocorrelation), a procedure that necessitates the evaluation of $X_{k,l,m}$, which is very challenging computationally since a large number of these coefficients needs to be found. A good approximation can be obtained in the case of Nyquist pulses with a square power spectrum of width B. While the analytical details of this approximation exceed the scope of this paper and will be provided separately, it allows the assessment of the means and variances of the coefficients $h_k^{(n)}$. For the zeroth coefficient $h_0^{(n)} = i\theta_n$, the mean and variance have been given in [6, 14]. In the case of higher order ISI coefficients ($h_k^{(n)}$ for $|k| \geq 1$), the mean can be shown to be zero and the variance is given by $$\langle |h_k|^2 \rangle = \left(\frac{2\gamma^2 L}{|\beta''|\pi^3}\right)\frac{1}{k^2}\Sigma_s\left[A(x_s)(\langle|b_n|^4\rangle - \langle|b_n|^2\rangle^2) + (A(x_s) + B_k(x_s))\langle|b_n|^2\rangle^2\right], \quad (4)$$

where the superscript (n) was omitted since stationary implies that the variance $\langle |h_k^{(n)}| \rangle$ depends only on the value of k. The coefficients appearing in the equation are $$A(x) = 1 - \frac{x+1}{2}\ln\left(\frac{x+1}{x}\right) + \frac{x-1}{2}\ln\left(\frac{x-1}{x}\right) \simeq \frac{1}{6x^2} \text{ and}$$

$$B_k(x) = \left(\frac{1}{x^2} + \frac{1}{x^4} + \frac{1}{x^6} + \frac{1}{x^8}\right)\left(\frac{1}{6} - \frac{1}{\pi^2 k^2}\right) \simeq \frac{1}{6x^2}.$$

The summation in Eq. (4) is over all neighboring channels, and $x_s = B/|\Omega_s|$ with $\Omega_s$ being the frequency separation between the channel of interest and the s-th neighboring channel. Substitution of $\langle |h_k|^2 \rangle$ into Eq. (2) and summation over all $|k| \geq 1$ yields the NLIN that remains after nonlinear phase-noise is eliminated by means of an efficient phase-recovery algorithm. Summation over $|k| \geq k_0$ gives the NLIN variance that remains after both the phase-noise as well as ISI from $k_0$ nearest symbols has been eliminated by a proper algorithm. It is important to note that only the first phase-noise component of NLIN (the term that is proportional to $\langle |b_n|^4 \rangle - \langle |b_n|^2 \rangle^2$) is proportional to $\Omega_s^{-1}$, which implies logarithmic growth with the number of channels. All other terms depend on $\Omega_s^{-2}$, implying that the dependence on the number of WDM channels saturates rapidly.

Numerical Validation

Validation of the theoretical results was performed in a set of split-step Fourier simulations. The simulations were performed for a 500 km system over a standard single mode fiber in a setting that is similar to the one used in [3] for the estimation of channel capacity. Specifically, we assumed a dispersion coefficient of 21 ps$^2$/km, a nonlinearity coefficient $\gamma = 1.3$ W$^{-1}$ km$^{-1}$, a baud-rate of 100 Gbaud/s, and a channel spacing of 102 GHz. Nyquist pulses of a perfectly square optical spectrum (of 100 GHz width) were used. The number of simulated symbols in each run was 8192 and up to 500 runs (each with independent and random data symbols) were performed with each set of system parameters, so as to accumulate sufficient statistics. The data symbols of the various channels were generated independently. Use of very long sequences in every run is critical in such simulations so as to achieve acceptable accuracy in view of the long correlation time of NLIN, as well as to avoid artifacts related to the periodicity of the signals that is imposed by the use of the discrete Fourier transform. We simulated up to 5 WDM channels (as specified in the figures). At the receiver the channel of interest was isolated with a matched optical filter and back-propagated so as to eliminate intra-channel effects and chromatic dispersion.

Figures 4A, 4B, 4C:
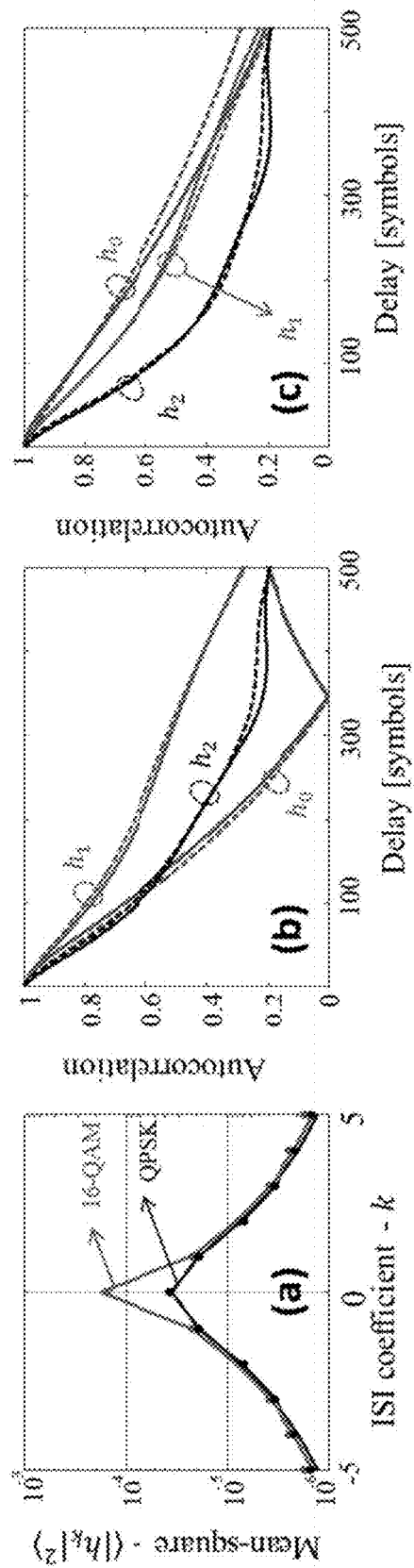
FIGS. 4A-4C and 5A-5B illustrate mean-square values of ISI coefficients, autocorrelation functions of various ISI coefficients, Non-Linear Interference Noise (NLIN) power versus input power for QPSK and 16-QAM modulation formats according to an embodiment of the invention.

In FIGS. 4A-4C there are provided results that validate the analysis by comparing the mean square value of the ISI coefficients $\langle |h_k|^2 \rangle$ given by Eq. (5) with the values extracted from the simulations. The excellent agreement between theory and simulation is self-evident.

The extraction of $h_k^{(n)}$ from the simulations is based on the least-squares estimation method with a window size of 50 symbols (similar to the provisional patent incorporated by reference).

The ability to extract the coefficients numerically relies on their long temporal correlation, which can be seen in FIGS. 4B and 4C, where the autocorrelation functions of $h_0$, $h_1$, and $h_2$ are plotted. The dashed and solid curves correspond to the theoretical results and the results obtained from simulations, respectively. We note that for each k the coefficients $h_k$, and $h_{-k}$ share the same autocorrelation function.

Figure 5B:
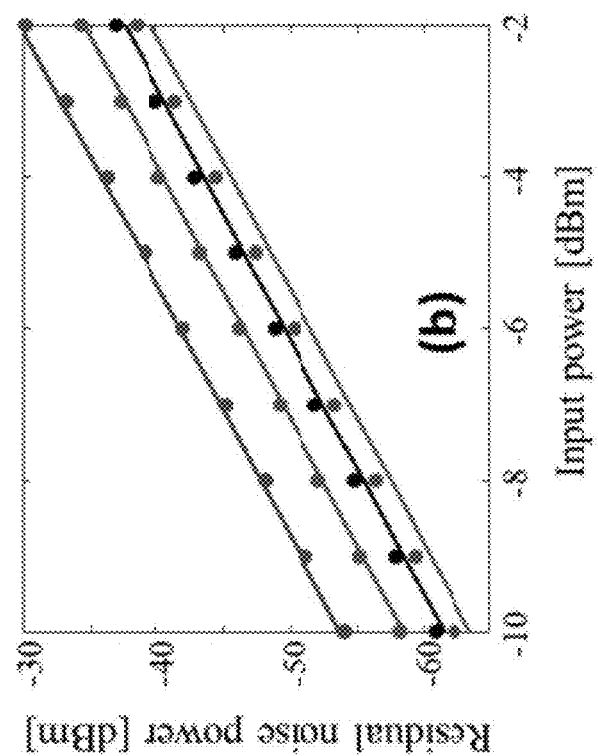
Figure 5A:
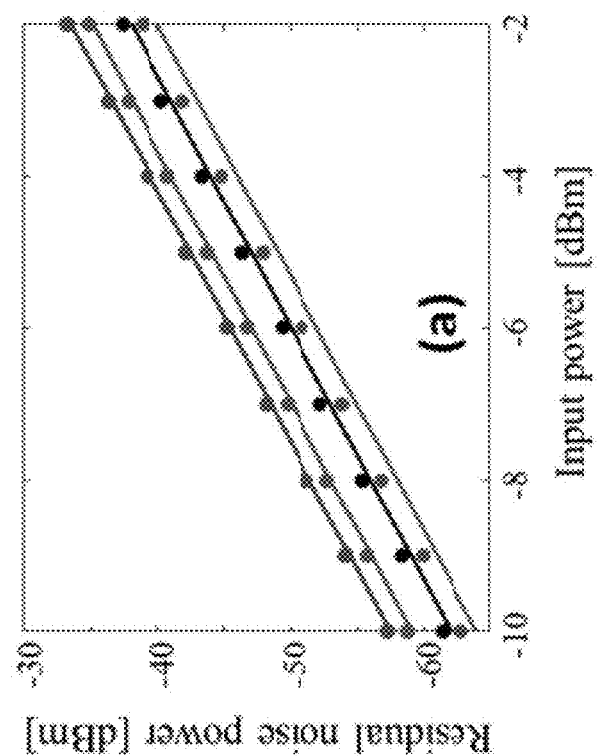

The potential effectiveness of nonlinear ISI cancellation is illustrated in FIGS. 5A and 5B. The curves and the symbols represent the results of the analysis and simulations, respectively. The blue curve shows the total noise power, without ISI cancellation. The red curve shows the remaining noise power after the contribution of the zeroth ISI coefficient $h_0$ (i.e. the phase-noise) is compensated for. The black curve shows the noise after cancellation of $h_0$ and $h_{\pm 1}$, and the green curve corresponds to the case where the effects of $h_0$, $h_{\pm 1}$ and $h_{\pm 2}$ are compensated for. In the case of QPSK modulation the potential gain from compensating for all five coefficients is 5.6 dB, whereas the gain compensating only for $h_0$ (the phase-noise) is 1.6 dB. In the case of 16-QAM the gains are 8 dB and 4 dB for compensation of all five coefficients and only $h_0$, respectively (slightly less than obtained with Gaussian modulation).

Accordingly, the inventors have shown that nonlinear interference between WDM channels manifests itself as a time varying ISI. The ISI coefficients have been expressed and characterized analytically. Their slow dependence on time allows their extraction from the received data, making compensation for the nonlinear interference possible. Potential gains of 5.6 dB and 8 dB have been demonstrated in the cases of QPSK and 16-QAM modulation.

As indicated above—prior to the invention nonlinear interference noise was treated as additive Gaussian noise and this treatment determined the communication performance. It has been found by the inventors that the NLIN is not merely additive but includes significant information about the channel. The NLIN was shown to have the effect of linear ISI where the ISI coefficients change slowly with time. A communication scheme can be built so that the ISI effects can be measured for some symbols of a block and then can be cancelled based upon these measurements.

Accordingly—this situation implies that the effect of NLIN can be canceled by means of adaptive equalization.

The ISI (as well as its cancellation) can be categorized in terms of ISI orders. ISI of zeroth order is represented by the coefficient h_0 in Eq. 1 above and it is just the same as the phase noise that we discussed in Appendix A of US provisional patent serial number 61903412 filing date Nov. 13, 2013 which is incorporated by reference. ISI of first order is represented by the coefficients h_1 and h_{-1} in Eq. 1 of Appendix A of U.S. provisional patent Ser. No. 61/903,412 filing date Nov. 13, 2013 which is incorporated by reference etc. The inventors argue that cancellation of at least the first 2 orders of ISI (h_k, with k=0, 1, 2, -1, -2 in Eq. 1 of Appendix A of U.S. provisional patent Ser. No. 61/903,412 filing date Nov. 13, 2013 which is incorporated by reference) is possible and beneficial.

The noise cancellation may require to perform adaptations to existing systems in order to take advantage of this characterization of phase noise and ISI.

Another adaptation that can be inspired by this discovery is to prefer the use of distributed Raman amplifiers within the optic fibers as opposed to the lumped EDFA technology used for signal amplification in the optic fibers in most systems today. That is because in the presence of distributed Raman amplification cancellation of NUN can be performed more effectively.

Raman amplifiers are rarely used due to their increased cost and relatively limited benefits. In addition to their reduced noise figure, with respect to EDFA technology, Raman amplifier can enhance the cancellation of the phase noise and/or ISI under the assumptions listed above (in the provisional patents incorporated by reference), since the block in which the phase noise/ISI coefficients are assumed to be almost constant, is expected to be longer in the Raman amplification case. This allows better estimation of the phase noise and/or ISI coefficients and thus better noise cancellation The learning of the ISI can occur over one or more symbols of the blocks and even over the entire symbols of the blocks. The learning and cancelling process can be executed in an iterative manner—leaning ISI, cancelling ISI, evaluating the outcome of the cancelling process and adjusting the cancellation process. The symbols (some or all) of a block can be buffered in order to learn the ISI and to determine how to cancel it and then the cancellation can be applied on symbols of the block—including those that were processed during the learning phase.

According to an embodiment of the invention a WDM transmission method can be provided and may include: (a) determining a WDM communication scheme based upon the capability to measure and cancel ISI per block of symbols; and (b) exchanging information according to the WDM communication scheme.

According to an embodiment of the invention a WDM transmission method can be provided and may include exchanging information that is conveyed in multiple blocks of symbols, wherein the exchanging of information comprises learning and cancelling ISI per block of symbols.

According to an embodiment of the invention a non-transitory computer readable medium can be provided that stores instructions that once executed by a computer will cause the computer to execute the stages of: determining a WDM communication scheme based upon the capability to measure and cancel ISI per block of symbols; and (b) exchanging information according to the WDM communication scheme.

According to an embodiment of the invention a non-transitory computer readable medium can be provided that stores instructions that once executed by a computer will cause the computer to execute the stages of: exchanging information that is conveyed in multiple blocks of symbols, wherein the exchanging of information comprises learning and cancelling ISI per block of symbols.

According to an embodiment of the invention a system for WDM transmission can be provided and may include: a computer for determining a WDM communication scheme based upon the capability to measure and cancel ISI per block of symbols. The system may also include a transceiver for exchanging information according to the WDM communication scheme.

According to an embodiment of the invention a WDM transceiver can be provided and can be arranged to exchange information that is conveyed in multiple blocks of symbols. The WDM transceiver includes or is coupled to a noise cancellation module (a processor) that is arranged to learn the ISI and cancel the ISI per block of symbols.

Noise Cancellation in a Multiple-Polarization Transmission Scheme

It has been found that the temporal correlations of inter-channel NLIN can be exploited for its mitigation in various circumstances—including in systems that transmit information using multiple polarizations concurrently. The temporal correlations make NLIN equivalent to a linear inter-symbol-interference (ISI) impairment with slowly varying coefficients, and hence the task of its mitigation can be approached by means of linear equalization with adaptive coefficients.

The following includes considering a practical equalization algorithm and applying it to a realistic system involving 5 pol-muxed 16-QAM channels, operating at 32 Giga-baud, and spaced by 50 GHz from one another, using lumped or Raman amplification.

The two polarization samples of the n-th received symbol in the channel of interest can be expressed as $r_n = \underline{a}_n + \Delta \underline{a}_n + z_n$, where $\underline{a}_n$ is the vector of transmitted data-symbols, $\Delta \underline{a}_n$ is the NLIN vector, and $z_n$ accounts ASE noise. As in [4], $\Delta \underline{a}_n$ is given by: $\Delta \underline{a}_n = \Sigma_k H_k^{(n)} \underline{a}_{n-k}$ Where $H_k^{(n)}$ is a 2×2 interference matrix, which generalizes the scalar ISI coefficient appearing in the single polarization case. The superscript (n) in $H_k^{(n)}$ accounts for the time dependence of the interference coefficients, whereas we refer to the index k as the "interference order." While in the single polarization case 4, the zeroth interference order was equivalent to phase-noise, in the pol-muxed scenario, only the diagonal terms of $H_k^{(n)}$ correspond to phase noise, whereas the off-diagonal terms represent interference between the two polarizations, mediated by the nonlinear interaction with neighboring channels.

We show in what follows that the NLIN contributions of the diagonal and off-diagonal terms are similar in magnitude. As we also show in what follows, the zeroth interference order $H_k^{(n)}$ is the one whose time dependence is the slowest, and hence its contribution to NLIN is the most amenable to mitigation. We show that the extent to which the system as a whole is amenable to NLIN cancellation strongly depends on the amplification strategy. In distributed amplification systems the zeroth-order interference term is dominant and its time correlation is the longest.

For this reason NLIN mitigation is very effective with this scheme. With lumped amplification the relative significance of the zeroth-order interference term is smaller and also its correlation length is shorted than it is with distributed amplification. Therefore, a system with lumped amplifiers is the least amenable to NLIN mitigation.

A practical compromise is a standard Raman amplified system, for example, of the kind demonstrated in [14]. As we show in this paper, the performance improvement that follows from NLIN mitigation in this case is quite notable.

Due to the very long computation times that are implied by the need to monitor error-rates, we first test our insight regarding time correlations and amplification strategies on a relatively short link, and then simulate a long Raman amplified link so as to characterize the effect on BER.

The inventors deployed idealized single-channel back-propagation in order to eliminate intra-channel distortions.

Slowly varying ISI model

It can be shown that in the case of a single interfering channel $H_k^{(n)} = \frac{8}{9} i\gamma \Sigma_{l,m}(\underline{b}_{n-m}\underline{b}_{n-l}^\dagger + \underline{b}_{n-l}^\dagger \underline{b}_{n-m} I) X_{k,l,m}$, where $b_k$ is the k-th vector of data symbols in the interfering channel, g is the usual nonlinearity coefficient and $X_{k,l,m}$ is a coefficient given in the provisional that is incorporated herein by reference, and which depends on the transmitted waveform, on the fiber parameters, and on the frequency separation between the channels. In the presence of multiple interferers the matrix $H_k^{(n)}$ equals the sum of the matrices representing the contributions of the single interferers.

In the limit of large accumulated dispersion, the number of nonzero terms in the summation becomes very large and the dependence of $H_k^{(n)}$ on the time n becomes weak, justifying the formulation in Eq. (1). As it turns out, the zeroth interference matrix $H_k^{(n)}$ which produces the strongest interference, is also the slowest changing one, and therefore the one whose estimation from the received data is most accurate. All of the NLIN mitigation examples that are shown in what follows are based on the cancellation of only the k=0 term.

The Simulated System

The inventors have performed a series of simulations assuming a five-channel polarization multiplexed WDM system implemented over standard single mode fiber (dispersion of 17 ps/nm/km, nonlinear coefficient g=1.3 [Wkm]⁻1, and attenuation of 0.2 dB per km).

The transmission consisted of Nyquist pulses at 32 Gigabaud and a standard channel spacing of 50 GHz. The number of simulated symbols in each run and for each polarization was 4096 when simulating a 500 km system, and 8192 when simulating 6000 km.

More than 100 runs (each with independent and random data symbols) were performed with each set of system parameters, so as to accumulate sufficient statistics. In the Raman amplified cases, a combination of co-propagating and counter-propagating Raman pumps, providing gains of 5 dB and 15 dB, respectively, as in [14].

At the receiver, the channel of interest was isolated with a matched optical filter and back-propagated so as to eliminate the effects of self-phase-modulation and chromatic dispersion. The noise figure of the lumped amplifiers was 4 dB and the Raman noise was generated with $n_{s\ p}$=1.26 (corresponding to a local NF of 4 dB).

To cancel the effect of the interference matrices $H_k^{(n)}$ we trained and tracked a canceling matrix, using a standard decision-aided approach based on the recursive least squares (RLS) algorithm.

The RLS algorithm converged faster than the more familiar least mean-squares (LMS) algorithm, and with a small filter order, the added complexity is tolerable. The algorithm uses a "forgetting factor" 1 which weights the past samples exponentially, where a smaller factor allows faster adaptation while a larger factor results in higher stability and convergence. In the experiments we used 1=0.98, 0.96, 0.9, specified for the cases of lumped, Raman and distributed amplification, respectively.

Results

Figure 6B:
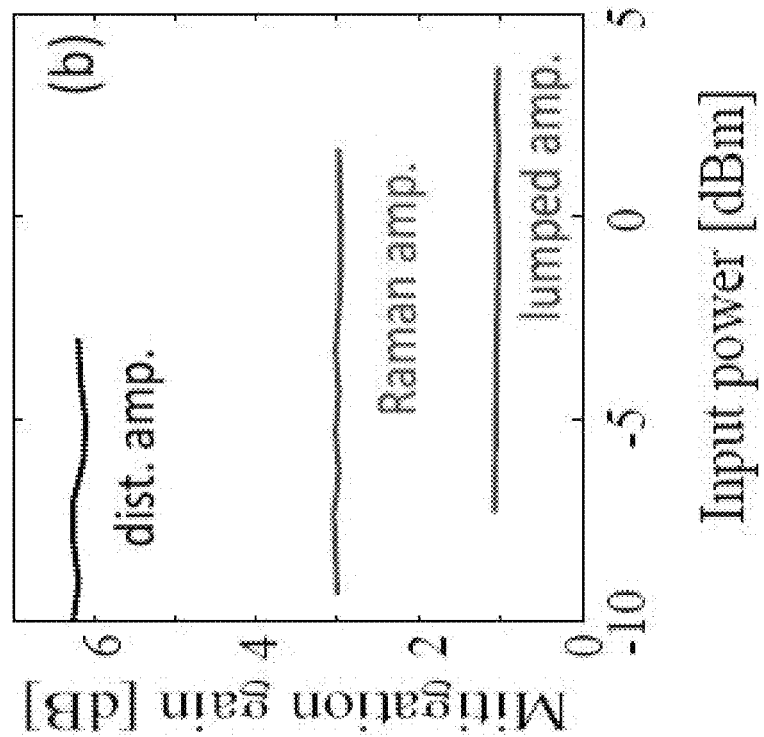
FIG. 6B illustrates a mitigation gain according to an embodiment of the invention.
Figure 6A:
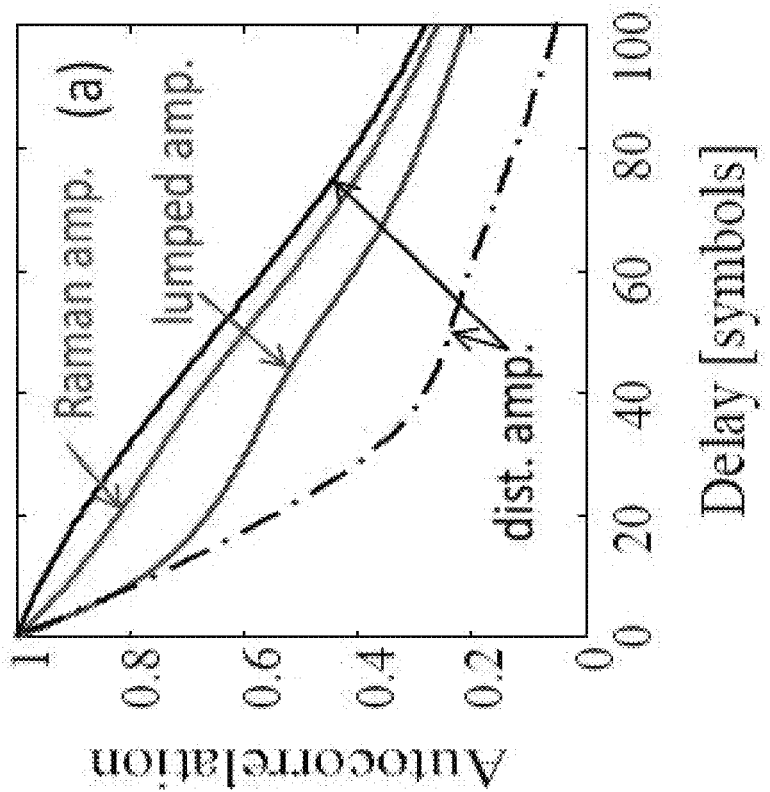
FIGS. 6A, 7 and 8 illustrate autocorrelation functions, effective SNR and BER according to an embodiment of the invention.

To gain insight on the temporal correlations the inventors plotted in FIG. 6A the autocorrelation function of one of the diagonal elements of $H_k^{(n)}$ in the three amplification strategies after 500 km of propagation (the four elements of $H_k^{(n)}$ have practically indistinguishable ACFs).

As can be seen in the figure, the correlations extend over a few tens of symbols, which is the key factor behind the implementation of the proposed mitigation approach.

The autocorrelation of the elements of $H_k^{(n)}$ for k>0 is generally much shorter, as can be seen from the dash-dotted curve in FIG. 6A showing the ACF of one diagonal element of $H_k^{(n)}$ in the distributed amplification case.

With the other amplification strategies the ACF of terms with k≥1 was too narrow to allow its reliable estimation. For this reason, only the mitigation of the k=0 matrix is considered in what follows. In FIG. 6B we show the NLIN mitigation gain defined as the ratio between the NLIN variances before and after mitigation.

As is evident from the figure, the significance of the zeroth interference term $H_k^{(n)}$ is largest in the case of distributed amplification and smallest in the lumped amplification case.

Figure 7:
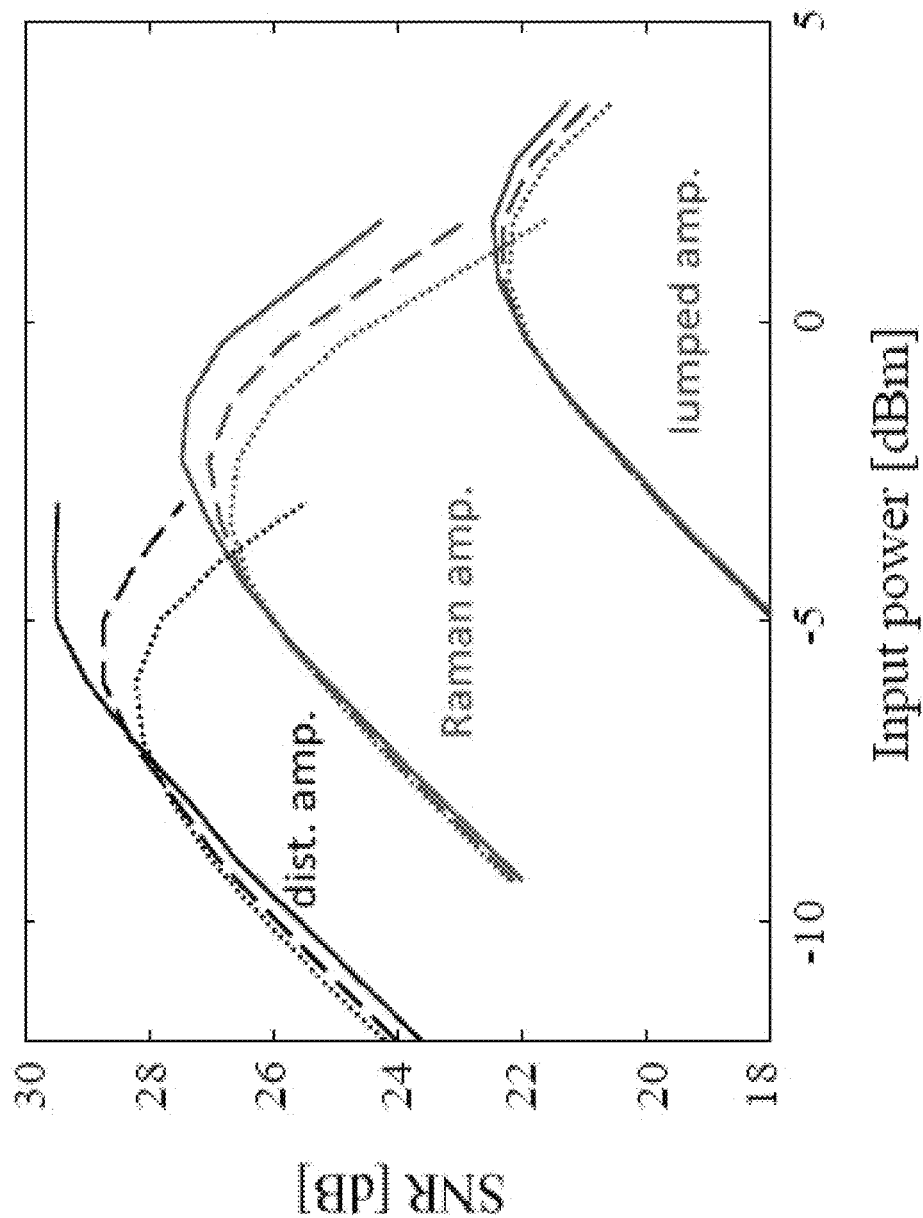

In FIG. 7 we show the effective SNR curves with (solid) and without (dotted) NLIN mitigation. The peak SNR after mitigation is larger than the peak SNR prior to mitigation by 0.3 dB (with lumped amp.), 0.9 dB (with Raman amp.) and 1.3 dB (with distributed amp). The dashed curves in the figure represent the case in which mitigation addresses only the diagonal terms of $H_k^{(n)}$, showing that the advantage of accounting for NLIN induced interference between polarizations is notable.

Figure 8:
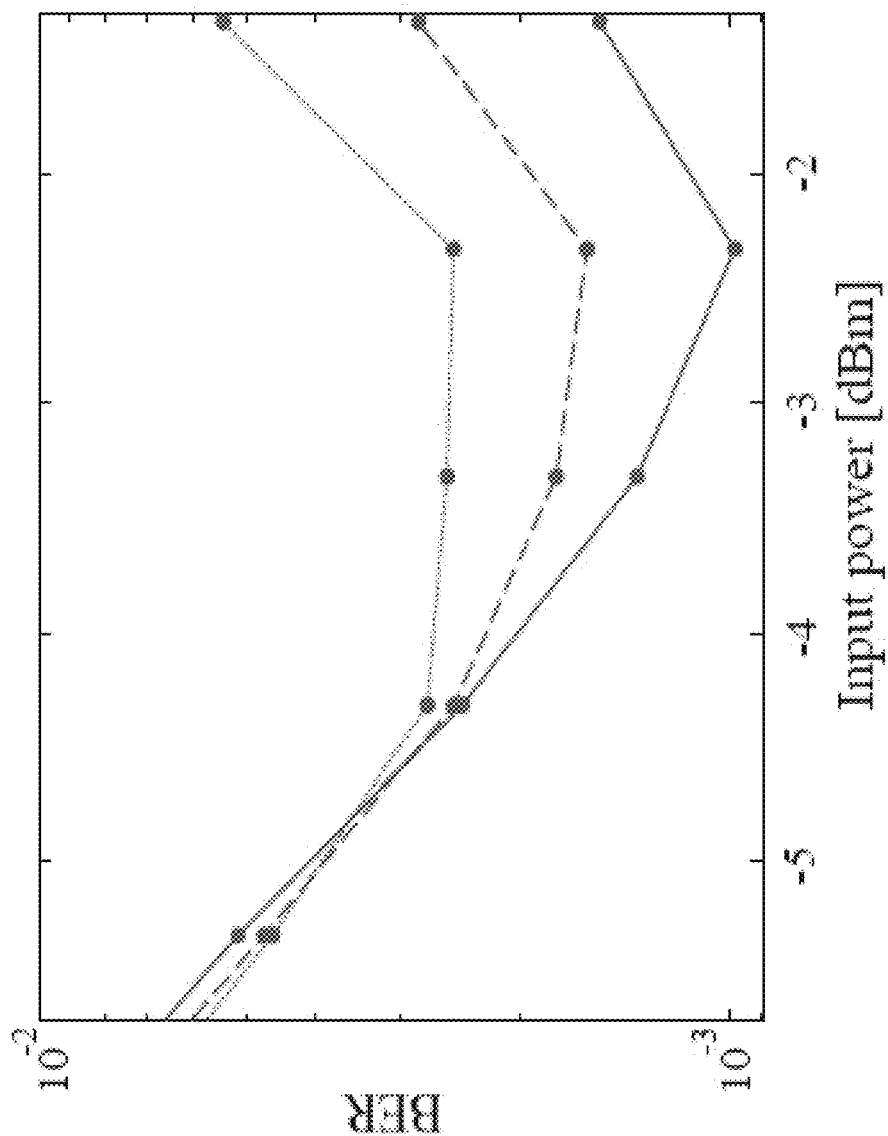

Finally we address in FIG. 8 the consequences of mitigation in terms of the system BER. Since truly distributed amplification is of limited practical interest, we chose to concentrate this highly computationally intensive set of simulations on the case of the practical Raman-amplified scenario, where the gain of mitigation is higher than it is in the lumped amplification case (see FIG. 8). The simulations in this case were conducted for 60×100 km spans, so as to reach relevant BER values.

Figure 2:
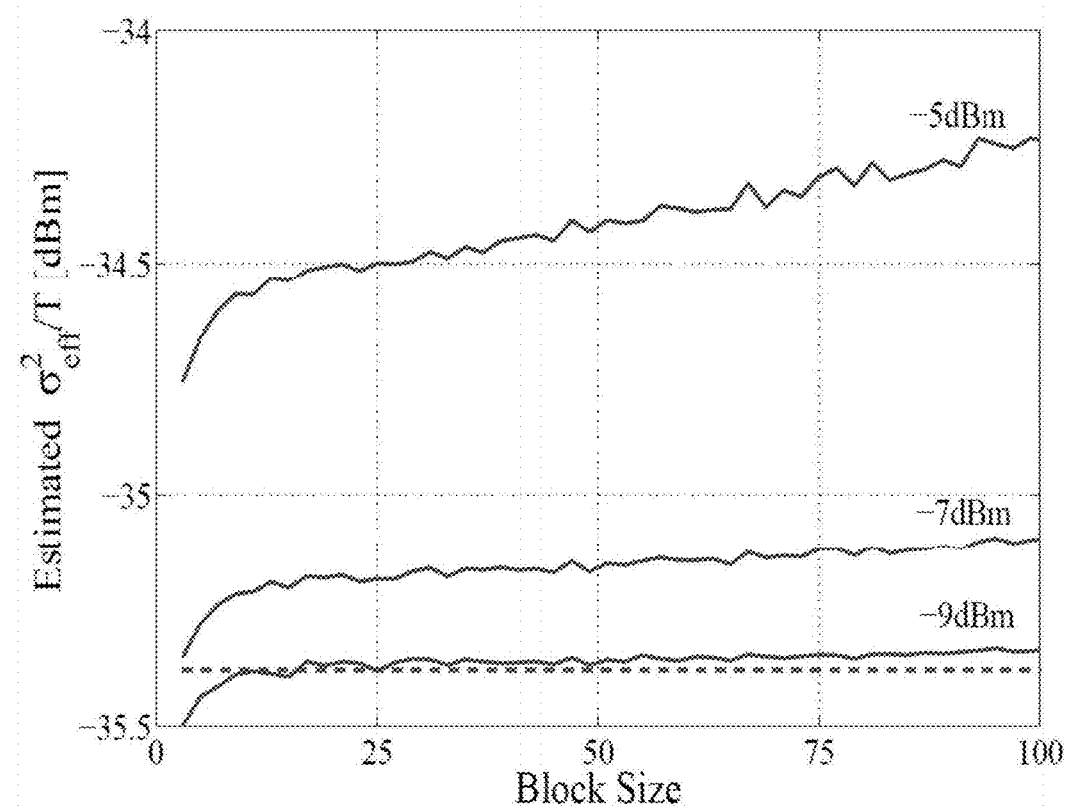
Figure 3A:
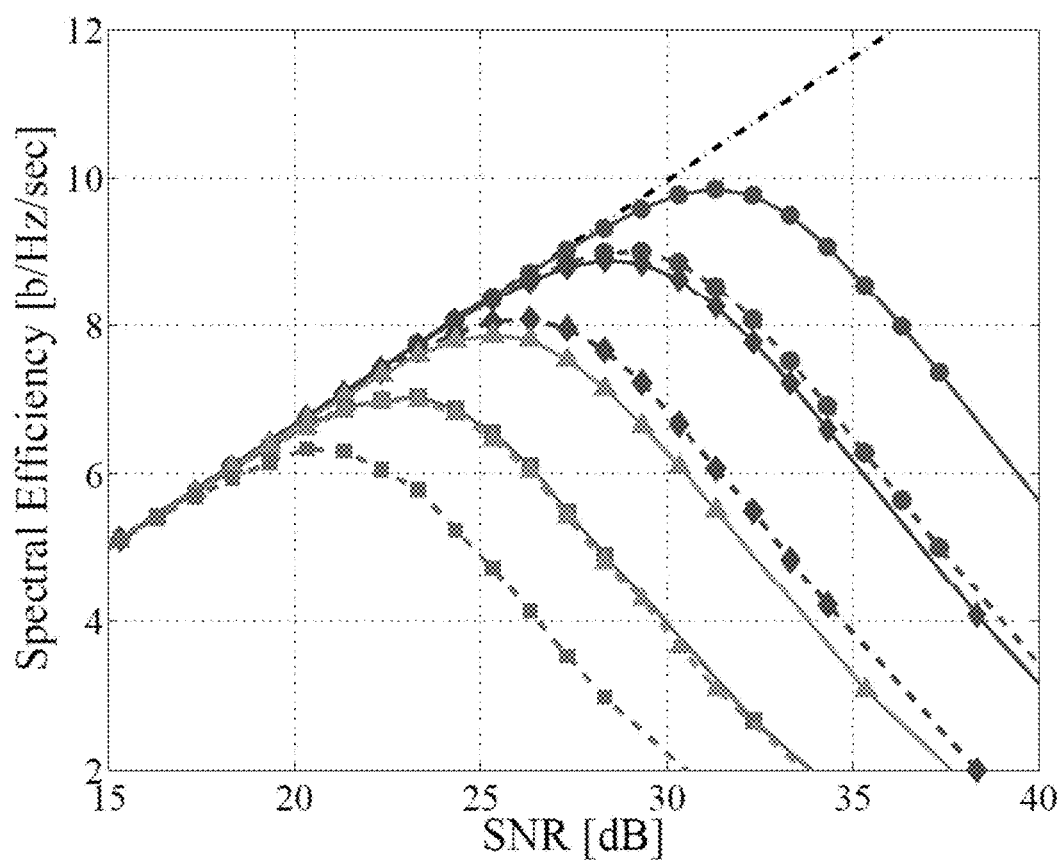
Figure 3B:
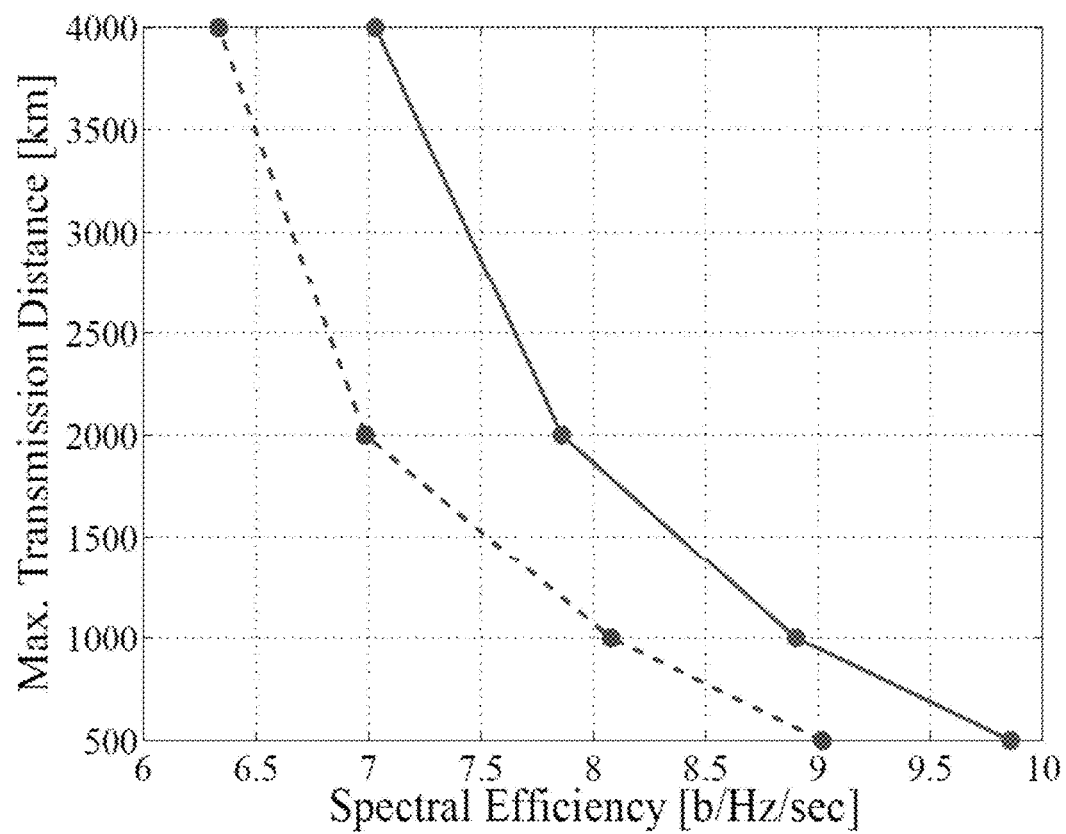
Figure 3C:
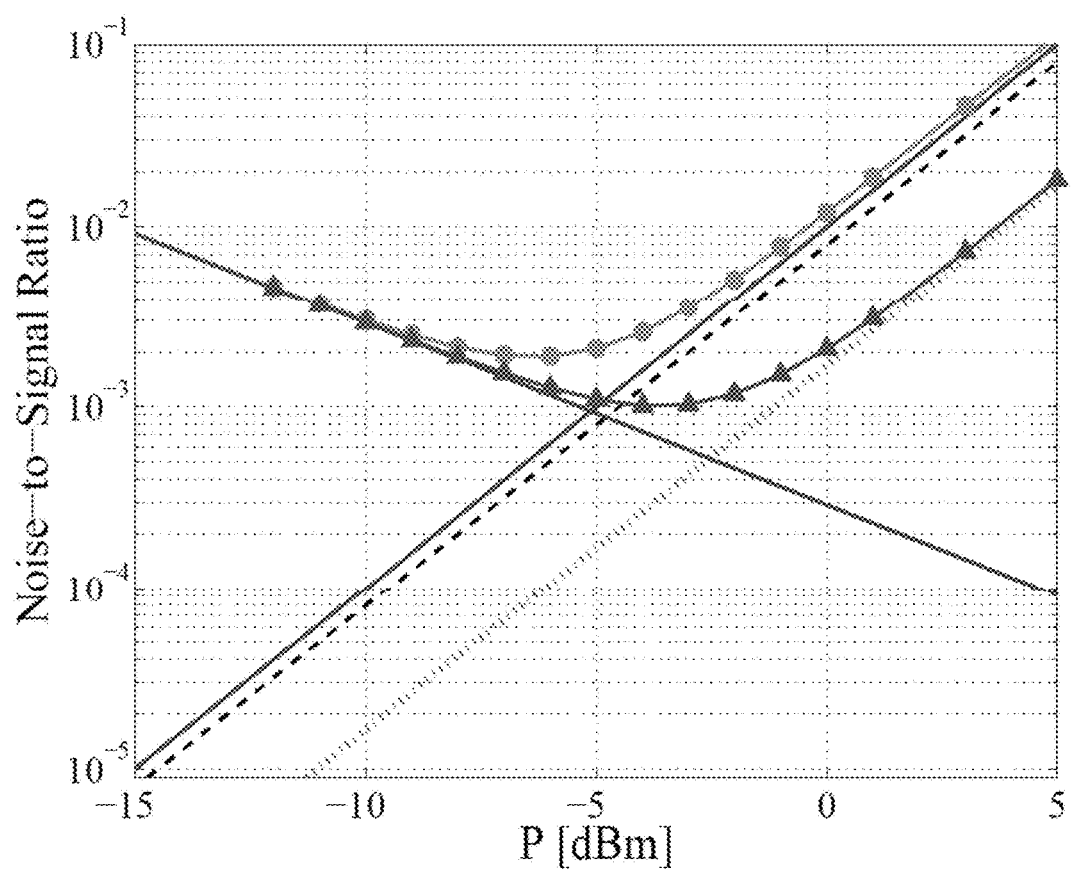

The dotted curve represents the case without mitigation and the solid curve represents the results obtained after canceling the effect of the zeroth interference term $H_k^{(n)}$, showing an improvement of the BER from $2.6 \times 10^{-3}$ to less than $1 \times 10^{-3}$, equivalent to approximately 1 dB gain in the Q factor. Equivalently, to achieve the same BER without NLIN mitigation the OSNR would have to be increased by 2.3 dB. Similarly to FIG. 2, the dashed curve shows the result obtained when only the effect of the diagonal terms in $H_k^{(n)}$ was mitigated, showing that approximately half of the mitigation gain is attributed to cross polarization interference.

Figure 9:
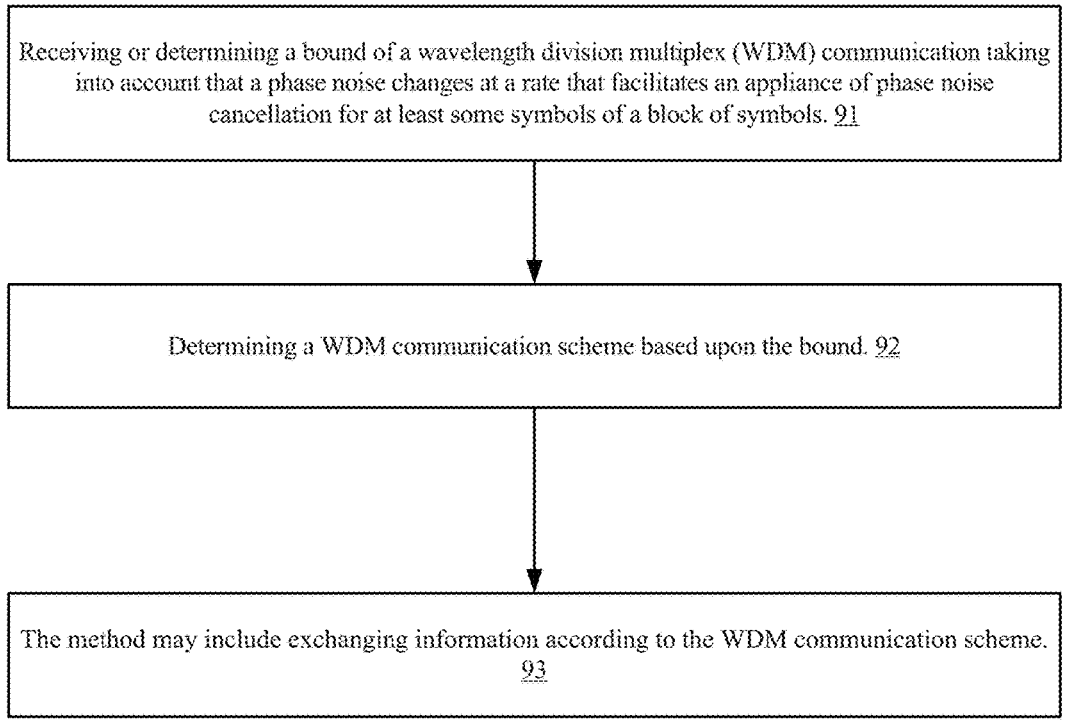
FIG. 9-15 illustrate methods according to embodiments of the invention.

Accordingly, the inventors have showed that significant improvement in system performance can be achieved by using adaptive linear equalization methods for mitigating inter-channel NLIN. The proposed scheme has the advantage of using the same type of hardware currently used for equalizing polarization effects, although the equalization algorithm and the speed of convergence are substantially different FIG. 9 illustrates a method 90 according to an embodiment of the invention. The method may include:
 a. Receiving or determining a bound of a wavelength division multiplex (WDM) communication taking into account that a phase noise changes at a rate that facilitates an appliance of phase noise cancellation for at least some symbols of a block of symbols (91).
 b. Determining a WDM communication scheme based upon the bound (92).

The method may include exchanging information according to the WDM communication scheme. (93).

The exchanging may include utilizing Raman amplifiers at receivers that receive the symbols.

The bound may be calculated according to equation 0.

Figure 10:
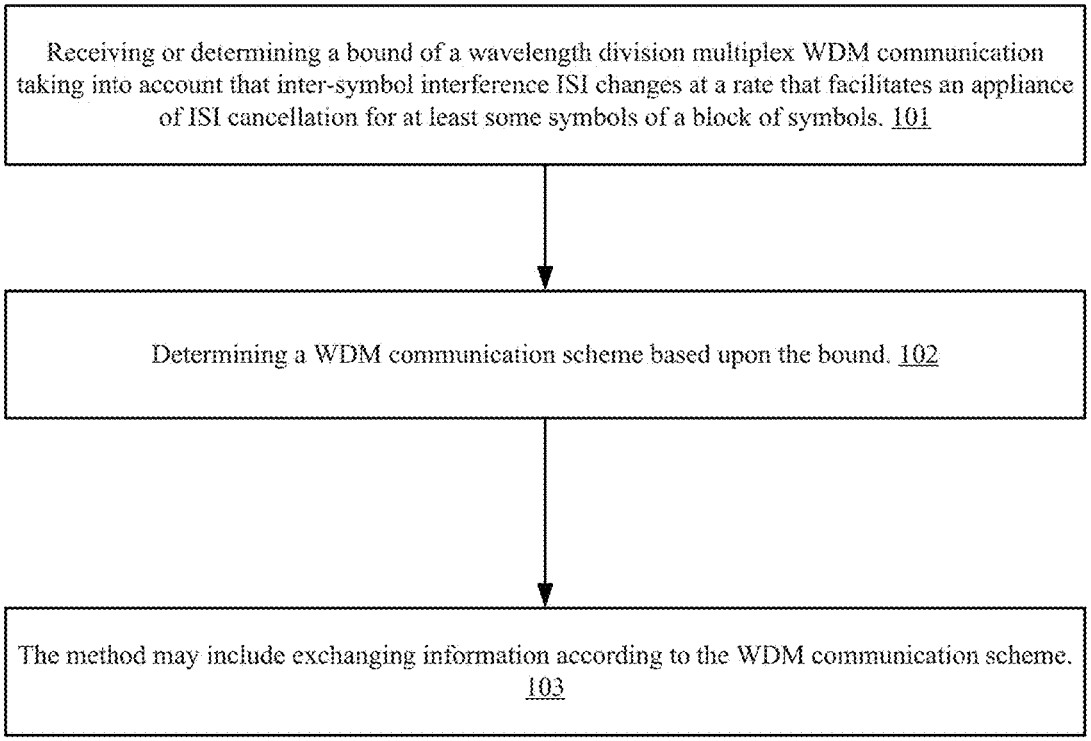

FIG. 10 illustrates method 100 according to an embodiment of the invention.

The method may include:
 a. Receiving or determining a bound of a wavelength division multiplex (WDM) communication taking into account that inter-symbol interference (ISI) changes at a rate that facilitates an appliance of ISI cancellation for at least some symbols of a block of symbols. (101).

b. Determining a WDM communication scheme based upon the bound. (102)

The method may include exchanging information according to the WDM communication scheme (103).

The exchanging may include utilizing Raman amplifiers at receivers that receive the symbols.

The bound may be calculated according to equation 0.

Figure 11:
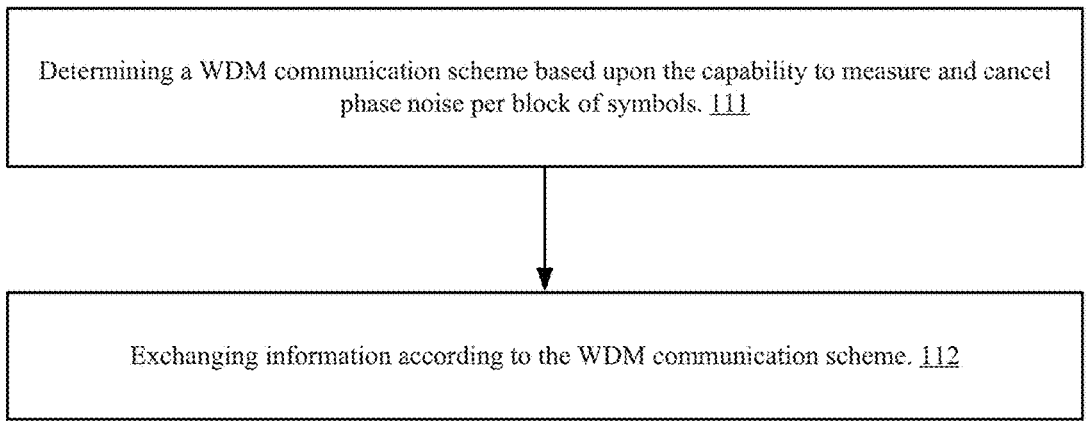

FIG. 11 illustrates a method 110 according to an embodiment of the invention.

The method may include:
a. Determining a WDM communication scheme based upon the capability to measure and cancel phase noise per block of symbols (111).
b. Exchanging information according to the WDM communication scheme (112).

Figure 12:
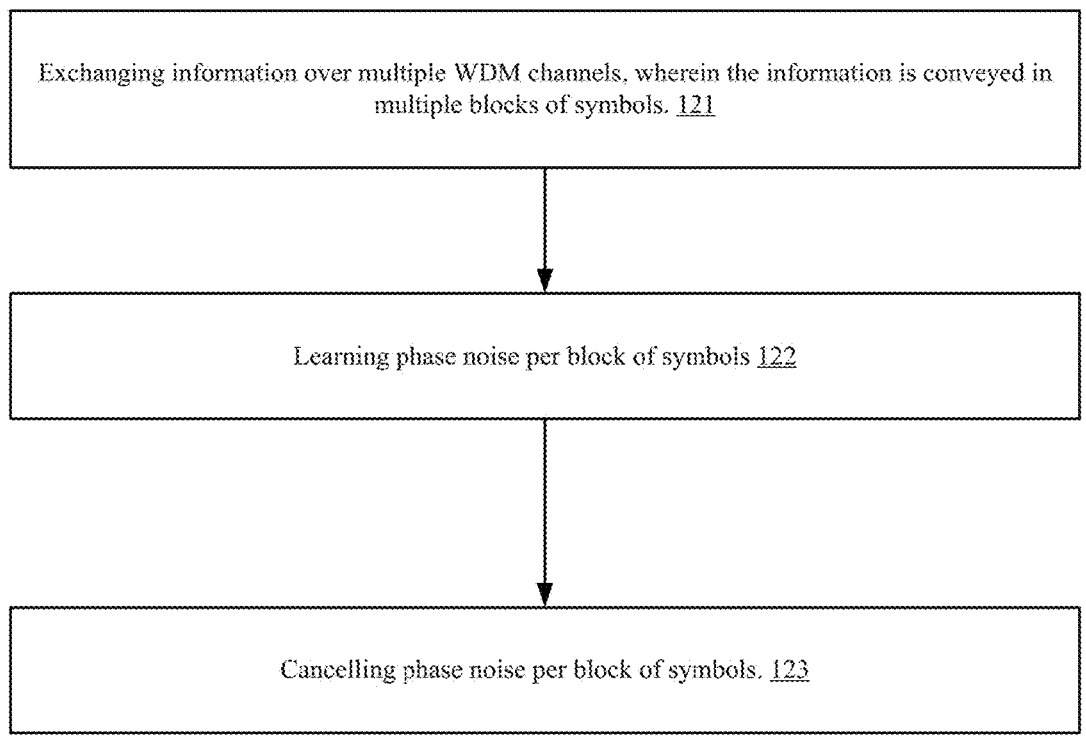

FIG. 12 illustrates a method 120 according to an embodiment of the invention.

The method may include:
a. Exchanging information that is conveyed in multiple blocks of symbols (121), wherein the exchanging of information comprises learning (122) and cancelling (123) phase noise per block of symbols.

Figure 13:
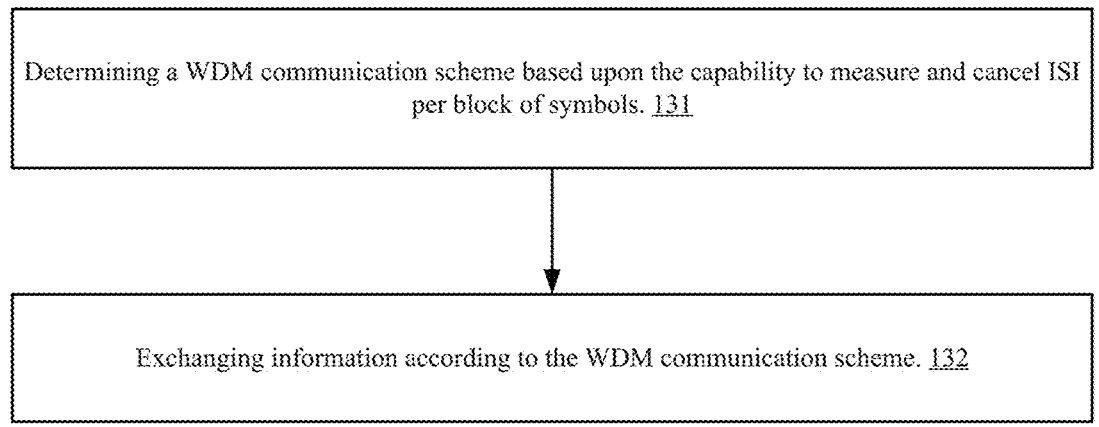

FIG. 13 illustrates a method 130 according to an embodiment of the invention.

The method may include:
a. Determining a WDM communication scheme based upon the capability to measure and cancel ISI per block of symbols (131).
b. Exchanging information according to the WDM communication scheme (132).

Figure 14:
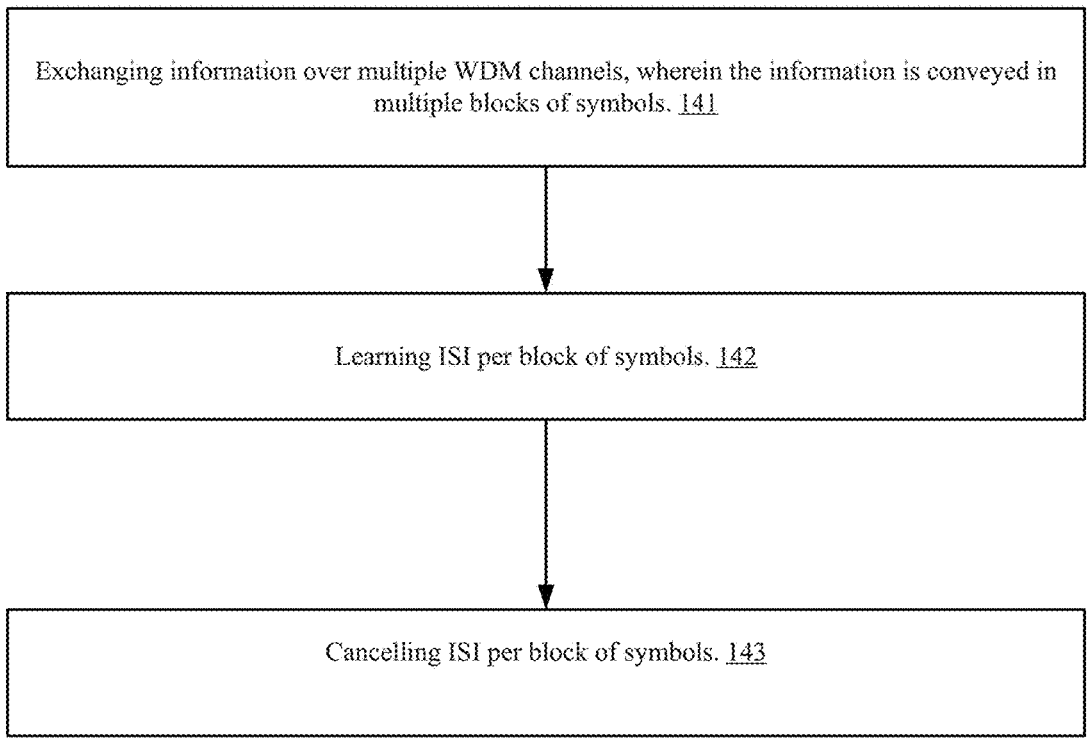

FIG. 14 illustrates a method 140 according to an embodiment of the invention.

The method may include:
a. Exchanging information that is conveyed in multiple blocks of symbols (141), wherein the exchanging of information comprises learning (142) and cancelling (143) ISI per block of symbols.

Figure 15:
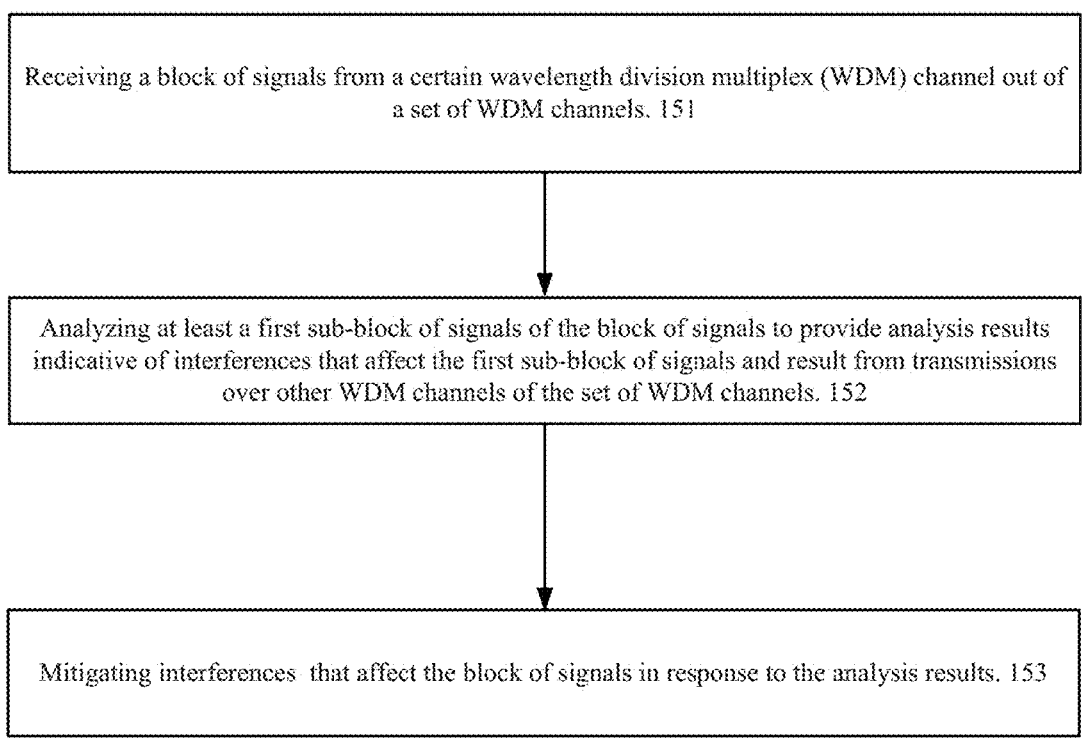

FIG. 15 illustrates a method 150 according to an embodiment of the invention.

Method 150 may include:
a. Receiving a block of signals from a certain wavelength division multiplex (WDM) channel out of a set of WDM channels. (151)
b. Analyzing at least a first sub-block of signals of the block of signals to provide analysis results indicative of interferences that affect the first sub-block of signals and result from transmissions over other WDM channels of the set of WDM channels. (152)
c. Mitigating interferences that affect the block of signals in response to the analysis results. (153)

The interferences that affect the block of signals may manifest as phase noise (see, for example, Appendix A of U.S. provisional patent Ser. No. 61/903,412 filing date Nov. 13, 2013 which is incorporated by reference).

The interferences that affect the block of signals manifest as inter-symbol interference (see, for example, "ISI cancellation").

The method may include repeating the receiving, analyzing and mitigating for each WDM channel.

The block of signals may be transmitted using a WDM communication scheme that is responsive to a mitigation of the interferences that affect the block of signals.

The WDM communication scheme may be responsive to lower capacity that equals $$\log_2\left(1 + \frac{P}{\sigma_{\textit{eff}}^2}\right) - \frac{1}{2N}E_v\left\{\log_2\left(1 + v\sigma_c^2\frac{P}{\sigma_{\textit{eff}}^2}\right)\right\} - \frac{1}{2N}E_v\left\{\log_2\left(1 + v\sigma_s^2\frac{P}{\sigma_{\textit{eff}}^2}\right)\right\}$$

wherein or $\sigma_{\textit{eff}}^2 = \sigma_{ASE}^2 + \sigma_{NL}^2$; P is a power of symbols; $\sigma_{ASE}$ is a variance of amplified spontaneous emission; $\sigma_{NL}^2$ is a variance of all nonlinear noise contributions that do not manifest themselves as a phase noise; $\sigma_s^2$ is a variance of a sinus of the phase noise; $\sigma_c^2$ is a variance of a cosine of the phase noise; $E_v$ stands for ensemble averaging with respect to a standard Chi-square distribution variable v with 2N degrees of freedom.

The analyzing may be responsive to multiple polarization components of the block of signals.

The analyzing may include utilizing an interference matrix.

Figure 16:
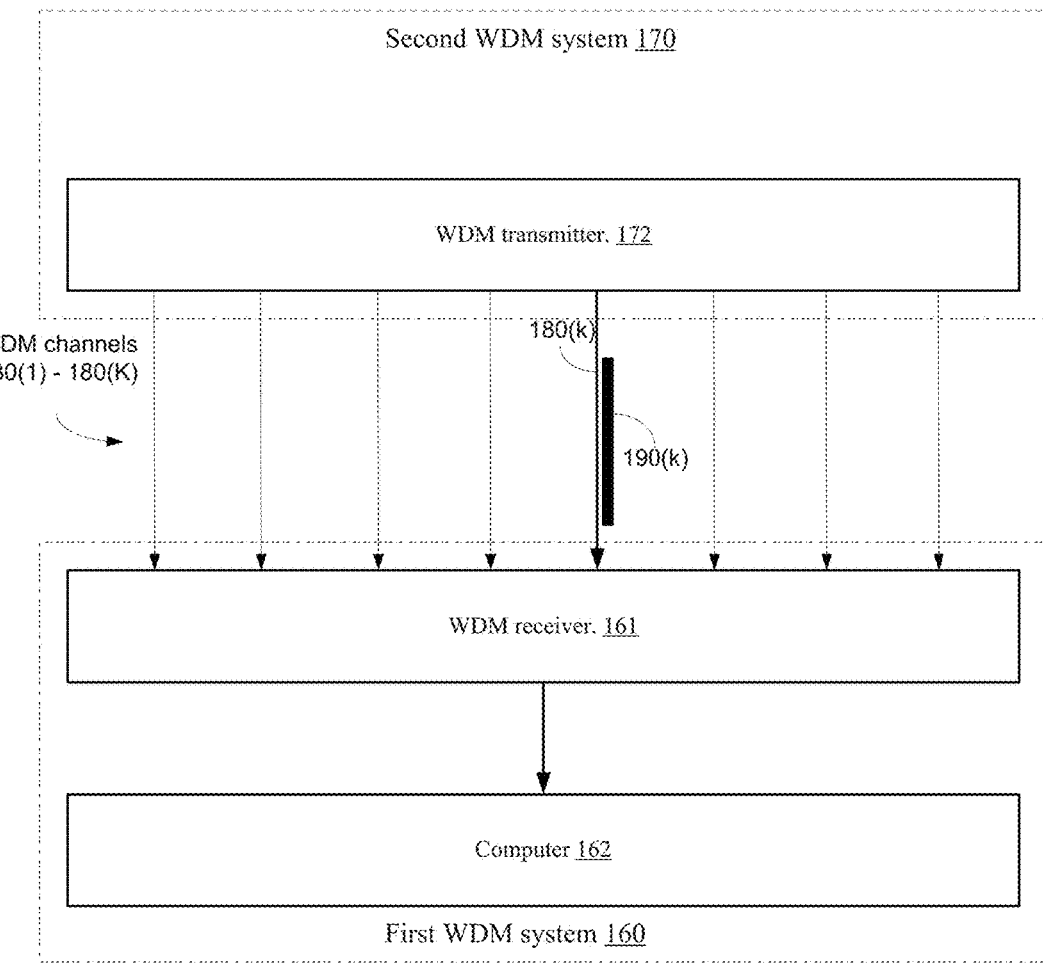
FIG. 16 illustrates a system according to an embodiment of the invention.

FIG. 16 illustrates first and second WDM systems according to an embodiment of the invention.

First WDM system 160 may include a WDM receiver 161 and a computer 162. It is shown as receiving information over K WDM channels (180(1)-180(K)) from WDM transmitter 172 of second WDM system 170.

The first WDM system 160 may include a transmitter and/or a transceiver. The second WDM system 170 may include a receiver and/or a transceiver and may include a computer.

FIG. 16 also shows that a certain WDM channel 180(k), wherein 1<k<K, conveys a block of signals 190(k). This block includes multiple consecutive signals. There may be few signals, few tens of signals and the like in a block. The length of the block may increase as the length of the medium between the first and second WDM channels increases. Amplifiers such as Raman amplifiers may be included in the medium.

First and/or second WDM systems may be arranged to execute any of the methods mentioned above.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method comprising: receiving, by a wavelength division multiplex (WDM) receiver of a WDM system, a block of signals from a certain WDM channel out of a set of WDM channels; analyzing, by a computer of the WDM system, at least a first sub-block of signals of the block of signals to provide analysis results indicative of interferences that affect the first sub-block of signals and result from transmissions over other WDM channels of the set of WDM channels; and mitigating, by the computer of the WDM system, interferences that affect the block of signals in response to the analysis results; wherein the interferences that affect the block of signals manifest as inter-symbol interference and wherein the mitigating of the interferences comprises inter-symbol interference cancellation.

2. A wavelength division multiplex (WDM) system, comprising a WDM receiver that is arranged to receive a block of signals from a certain WDM channel out of a set of WDM channels; a computer that is configured to analyze at least a first sub-block of signals of the block of signals to provide analysis results indicative of interferences that affect the first sub-block of signals and result from transmissions over other WDM channels of the set of WDM channels; and mitigate interferences that affect the block of signals in response to the analysis results; wherein the interferences that affect the block of signals manifest as inter-symbol interference and wherein the computer is configured to perform inter-symbol interference cancellation.

3. A non-transitory computer readable medium that stores instructions that once executed by a computer will cause the computer to execute the stages of: receiving from a wavelength division multiplex (WDM) receiver of a WDM system a block of signals from a certain WDM channel out of a set of WDM channels; wherein the computer belongs to the WDM system; analyzing, by the computer, at least a first sub-block of signals of the block of signals to provide analysis results indicative of interferences that affect the first sub-block of signals and result from transmissions over other WDM channels of the set of WDM channels; and mitigating, by the computer, interferences that affect the block of signals in response to the analysis results;
wherein the interferences that affect the block of signals manifest as inter-symbol interference and wherein the mitigating of the interferences comprises inter-symbol interference cancellation.

* * * * *